United States Patent
Lee et al.

(10) Patent No.: US 10,486,505 B2
(45) Date of Patent: Nov. 26, 2019

(54) SUN VISOR WITH DISPLAY OF TRAFFIC LIGHT

(71) Applicants: Hyundai Motor Company, Seoul (KR); Kia Motors Corporation, Seoul (KR)

(72) Inventors: Hui Sung Lee, Gunpo-si (KR); Hyoung Shin, Yongin-si (KR); Youngwook Song, Seoul (KR); Kichang Yi, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 123 days.

(21) Appl. No.: 15/835,161

(22) Filed: Dec. 7, 2017

(65) Prior Publication Data

US 2018/0236849 A1    Aug. 23, 2018

(30) Foreign Application Priority Data

Feb. 20, 2017    (KR) .................... 10-2017-0022451

(51) Int. Cl.
| | |
|---|---|
| *B60J 3/02* | (2006.01) |
| *B60R 11/04* | (2006.01) |
| *B60R 1/10* | (2006.01) |
| *B60R 1/00* | (2006.01) |
| *B60R 1/12* | (2006.01) |

(52) U.S. Cl.
CPC ............ *B60J 3/0204* (2013.01); *B60R 1/005* (2013.01); *B60R 1/10* (2013.01); *B60R 11/04* (2013.01); *B60R 2001/1223* (2013.01); *B60R 2001/1253* (2013.01); *B60R 2001/1269* (2013.01)

(58) Field of Classification Search
CPC .......... B60J 3/0204; B60R 1/005; B60R 1/10; B60R 11/04
USPC ...................................... 296/97.1, 97.4, 97.5
See application file for complete search history.

(56) References Cited

U.S. PATENT DOCUMENTS

| | | | |
|---|---|---|---|
| 2013/0141578 A1* | 6/2013 | Chundrlik, Jr. ........ | H04N 7/181 348/148 |
| 2014/0167442 A1* | 6/2014 | Chew ....................... | B60J 3/005 296/97.2 |
| 2018/0050636 A1* | 2/2018 | Espig ........................ | B60R 1/00 |

* cited by examiner

*Primary Examiner* — Joseph D. Pape
(74) *Attorney, Agent, or Firm* — Morgan, Lewis & Bockius LLP (57) ABSTRACT

A signal display sun visor may include a camera photographing an object in front of vehicle; a folding detector sensing whether or not the sun visor is opened; a traffic light detector determining a current location of the vehicle by receiving a GPS signal and whether a traffic light exists in front of the vehicle based on the current location by using map information; an image processor determining a traffic light from a digital image by processing and analyzing the digital image and a signal of the determined traffic light; a signal display unit displaying the signal of the traffic light determined by the image processor; and a controller controlling operation of the respective constituent elements, operating when the sun visor is opened at greater than or equal to a predetermined angle, and controlling the camera to photograph a traffic light when the traffic light exists in front of the vehicle.

13 Claims, 7 Drawing Sheets

SUN VISOR WITH DISPLAY OF TRAFFIC LIGHT

CROSS-REFERENCE TO RELATED APPLICATION

The present application claims priority to Korean Patent Application No. 10-2017-0022451 filed on Feb. 20, 2017, the entire contents of which is incorporated herein for all purposes by this reference.

BACKGROUND OF THE INVENTION

Field of the Invention

The present invention relates to a sun visor that can display a signal of a traffic light.

Description of Related Art

A sun visor is used to block sunlight to thereby protect the eye from the glare of the sun. Such a sun visor is generally provided above a driver's seat, is pulled down toward a front window to block sunlight, and is folded upward when not in use.

However, when the sun visor is in use, the sun visor is located close to the eyes of the driver, thereby interrupting the driver's visibility, and accordingly, the driver needs to bend his body or move to another location to verify a traffic light at an intersection. In addition, when the vehicle stops at a location where the traffic light cannot be seen, the driver cannot view a signal of the traffic light.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a signal display sun visor that enables a driver to determine a signal of a traffic light located in front of the vehicle without an effort even when visibility of a driver is interrupted by the sun visor while the sun visor is in use.

The exemplary embodiments of the present invention may be used for achieving other objects which are not specifically mentioned other than the above object.

According to an exemplary embodiment of the present invention, a signal display sun visor is provided.

The folding detector is formed of a switch that outputs an on-signal to the controller when the sun visor is opened at greater than or equal to the predetermined angle and outputs an off-signal to the controller when the sun visor is closed to less than the predetermined angle after being opened at greater than or equal to the predetermined angle.

Alternatively, the folding detector is formed of an angle detector that measures an open angle of the sun visor, compares the measured open angle with the predetermined angle, and notifies the measured open angle to the controller when the measured open angle is greater than or equal to the predetermined angle, and notifies the measured open angle to the controller when the measured open angle becomes less than the predetermined angle after being opened at greater than or equal to the predetermined angle.

The sun visor according to the exemplary embodiment of the present invention may further include an angle controller that interworks with the opening or closing operation of the sun visor to control an angle of the camera to photograph a view in front of the vehicle in a constant direction without regard to an open angle of the sun visor.

The angle controller includes a first device that rotates in a first direction according to an open degree of the sun visor, a second device that rotates in a second direction which is opposite to the second direction and is connected to the camera, and a third device that connects the first device and the second device configured for interworking of the first and second device.

The angle controller may include a first pulley provided in a hinge portion where the sun visor and a roof are coupled; a second pulley which is connected to the camera; and an interworking device connected to the first pulley and the second pulley for controlling the first pulley and the second pulley to interwork with each other.

The angle controller may include a first gear provided in a hinge portion where the sun visor and a roof are coupled; a second gear connected to the camera; and an interworking device connected to the first gear and the second gear for controlling the first gear and the second gear to interwork with each other.

Display of the signal display device may be the same as a signal of an actual traffic light or may be a text.

The controller is activated when the open angle of the sun visor is greater than or equal to a first predetermined angle and is deactivated when the open angle of the sun visor in the activated state becomes less than a second predetermined angle through a signal received from the folding sensor. The first predetermined angle and the second predetermined angle may be equal to each other or different from each other.

The traffic light detector is a navigation device disposed as an internal device in a vehicle or an external device including a mobile phone or a navigation device.

The image processor extracts a region of interest (ROI) where a traffic light exists from an image photographed by the camera, extracts a traffic light from the ROI, and determines a signal of the extracted traffic light.

According to the exemplary embodiment of the present invention, the driver does not need to move his body to verify a signal of a traffic signal in front of the vehicle even when the sun visor is in use, and the driver can easily the signal of the traffic signal even when the vehicle is located in a region where the traffic light cannot be seen.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Unless explicitly described to the contrary, the word "comprise" and variations such as "comprises" or "comprising" will be understood to imply the inclusion of stated elements but not the exclusion of any other elements. In addition, terms including "unit", "module", and the like disclosed in the specification mean a unit that processes at least one function or operation and this may be implemented by hardware or software or a combination of hardware and software.

Hereinafter, a signal display sun visor according to an exemplary embodiment of the present invention will be described with reference to the accompanying drawings.

Figure 1:
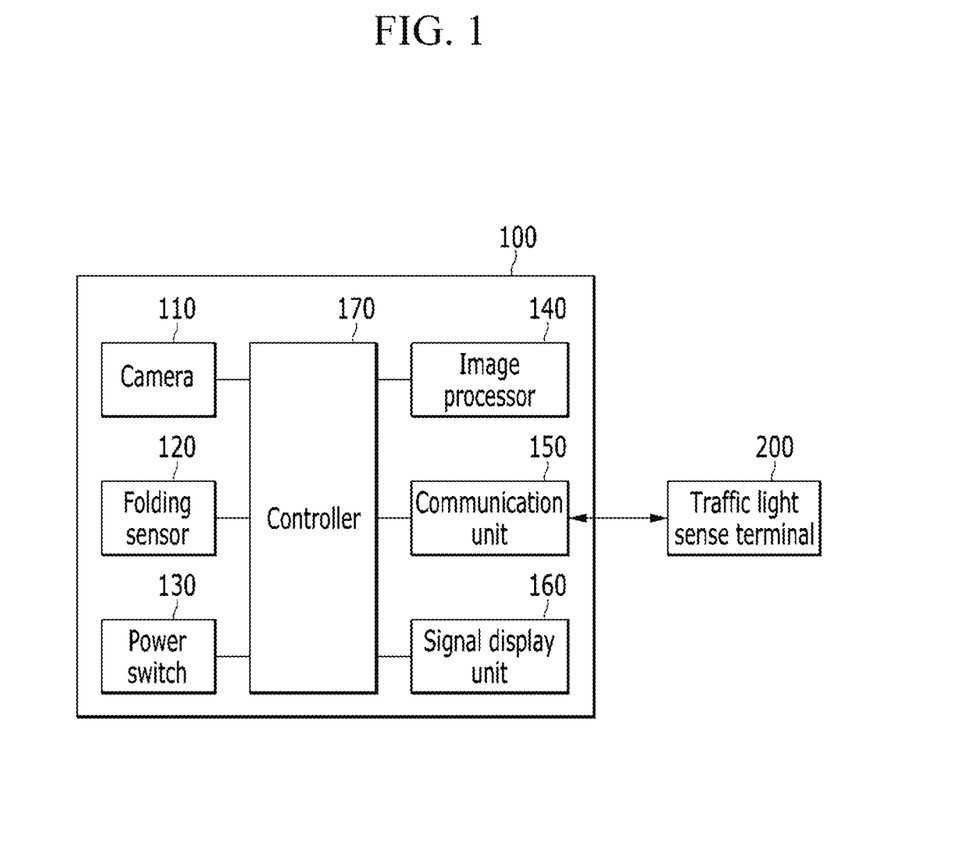
FIG. 1 is a block diagram of a sun visor displaying a signal according to various exemplary embodiments of the present invention.
Figure 3:
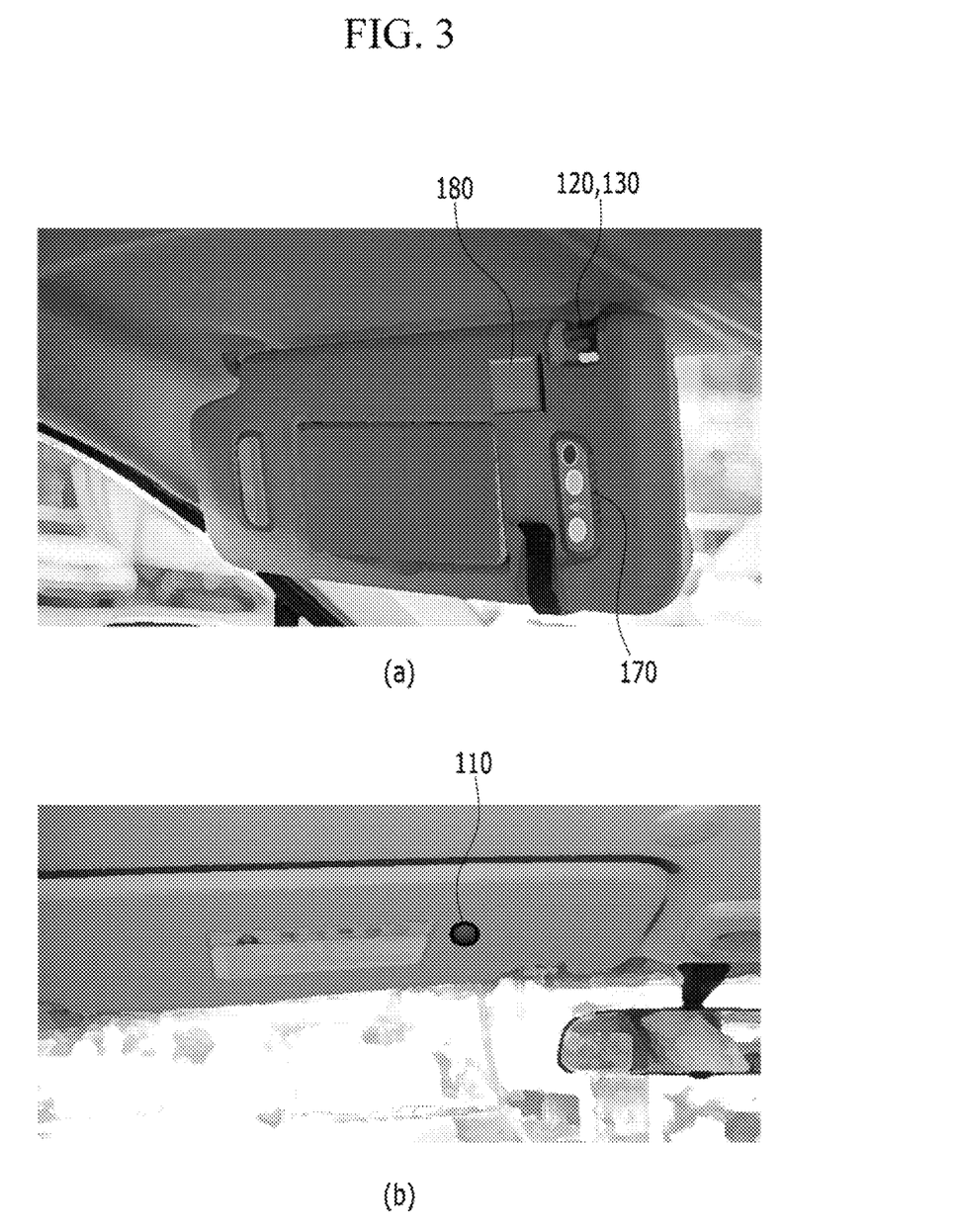
FIG. 3 shows an actual installation state of the signal display sun visor according to the exemplary embodiment of the present invention.

FIG. 1 is a block diagram of a signal display sun visor according to various exemplary embodiments of the present invention, and FIG. 3 shows an actual installation state of the signal display sun visor according to the exemplary embodiment of the present invention.

Referring to FIG. 1 and FIG. 3, a signal display sun visor 100 according to the various exemplary embodiments of the present invention includes a camera 110, a folding detector 120, a power switch 130, an image processor 140, a communication device 150, a signal display device 160, and a controller 170.

The camera 110 operates by control of the controller 170, and photographs an object in front of a vehicle and generates a digital image.

The folding detector 120 determines a start condition and a termination condition for signal display operation. The determination of the start condition and termination condition is performed to determine whether or not a driver utilizes a sun visor.

When no limitation is set in a power-on state, the camera 110, the controller 170, the image processor 140, and the like may operate even when the sun visor 110 is not opened (e.g., not unfolded). As shown in FIG. 3 (b), in a case that the camera 110 is provided to face the bottom surface of the vehicle when the sun visor 100 is folded, the lens of the camera 110 faces forward and accordingly photographs the front view of the vehicle when the sun visor 100 is deployed at greater than or equal to a predetermined angle. That is, the camera 110 cannot photograph a traffic light which is provided in front of the vehicle when the sun visor 100 is not deployed at greater than or equal to the predetermined angle.

Thus, it needs to determine a start condition to control the respective constituent elements to operate when the sun visor is opened at greater than or equal to the predetermined angle, and it needs to determine a terminal condition to terminate the operations of the respective constituent elements when the sun visor is folded to less than the predetermined angle after being opened at greater than or equal to the predetermined angle.

Thus, the folding detector 120 starts to operate when receiving power to detect whether the sun visor 100 is opened at greater than or equal to the predetermined angle, when the sun visor 100 is opened at greater than or equal to the predetermined angle, the folding detector 120 notifies this to the controller 170, and when the sun visor 100 is folded to less than the predetermined angle after being opened at greater than or equal to the predetermined angle, the folding detector 120 also notifies this to the controller 170. The folding detector 120 may be provided as a switch that outputs an on-signal when the sun visor 100 is opened at greater than or equal to the predetermined angle and outputs an off-signal when the sun visor 100 is not opened or is opened to less than the predetermined angle. Alternatively, the folding detector 120 may be provided as an angle detector that measures an open angle of the sun visor 100, and it compares the measured angle with the predetermined angle, and outputs a signal when the measured angle is greater than the predetermined angle and outputs a signal when the sun visor 100 is opened at greater than or equal to the predetermined angle and then the measured angle becomes less than the predetermined angle.

The power switch 130 is a switch that determined determines whether or not to supply power to the sun visor 100, and the image processor 140 processes and analyzes a digital image photographed by the camera 110 to determine whether a traffic light exists and checks a signal of the determined traffic light according to the control of the controller 170.

A traffic light detection terminal 200 determines operation of the camera 110. Since traffic lights are mostly provided at intersections and crosswalks, a time during which the traffic light is captured while driving is not very long compared to driving time, and the time during which the traffic light is captured is increased during a traffic jam. Therefore, it may be inefficient to control the camera 110 to continuously operate and determine whether or not a traffic light is disposed in a photographed image (i.e., a digital image) through signal processing.

To solve the inefficiency, the traffic light detection terminal 200 is used. The traffic light detection terminal 200 may be an external mobile or navigation device having a function to determine a current location using a GPS and to determine existence of a traffic light in front of the vehicle based on the current location by use of map information or a navigation device, which is an internal device disposed in the vehicle.

The communication device receives information on existence of a traffic light in front of the vehicle from the traffic light detection terminal 200 through wireless or wired communication with the traffic light detection terminal 200. The communication device 150 lets the camera 110 operate by notifying existence of the traffic light to the controller 170 when receiving a signal of the existence of the traffic light in front of the vehicle from the traffic light detection terminal 200. The camera 110 also operates when the sun visor 100 is opened at greater than or equal to the predetermined angle.

The signal display device 160 operates according to the control of the controller 170, and displays a signal of the traffic light determined by the image processor 140 including a red light, a green light, a yellow light, and a left-turn signal. In the instant case, as shown in (a) of FIG. 3, the signal display device 160 may display a signal like an actual traffic light, or may display text including "red light", "green light", "yellow light", "left-turn light", and the like.

The controller 170 controls operation of each constituent element, and is activated when an angle at which the sun visor 100 is opened through a signal received from the folding detector 120, that is, an open angle, is greater than or equal to a first predetermined angle, and is deactivated when the open angle of the sun visor 100 is greater than or equal to the first predetermined angle and then is less than a second predetermined angle through a signal received from the folding detector 120. Herein, the first predetermined angle and the second predetermined angle may be equal to each other or may be different from each other. When being activated, the controller 170 controls the camera 110 to photograph a traffic light through the traffic light detection terminal 200 when the traffic light exists in front of the vehicle.

Figure 2:
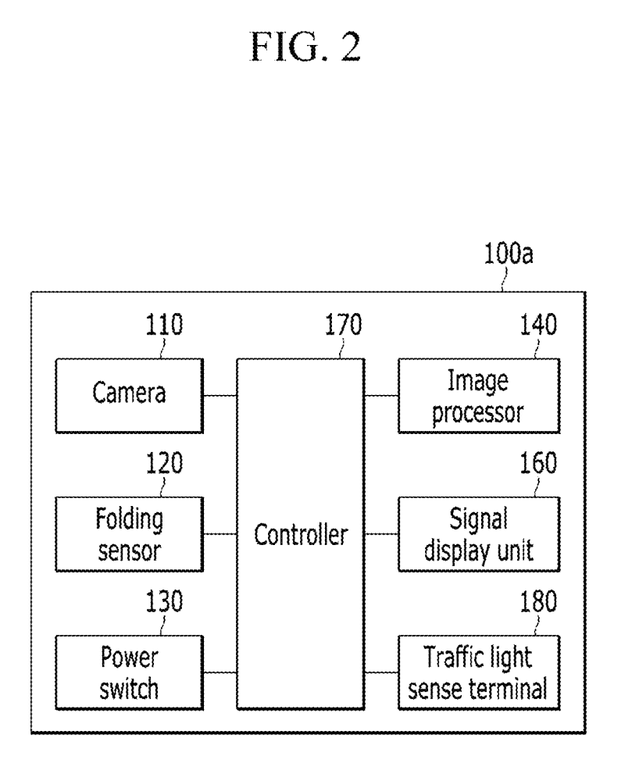
FIG. 2 is a block diagram of a sun visor displaying a signal according to various exemplary embodiments of the present invention.

Hereinafter, referring to FIG. 2, a signal display sun visor according to various exemplary embodiments of the present invention will be described. FIG. 2 is a block diagram of a signal display sun visor according to various exemplary embodiments of the present invention.

Referring to FIG. 2, a signal display sun visor 100a according to the various exemplary embodiments of the present invention includes a camera 110, a folding detector 120, a power switch 130, an image processor 140, a communication device 150, a signal display device 160, and a controller 170.

As shown in FIG. 2, the signal display sun visor 100a according to the various exemplary embodiments of the present invention has almost the same configuration as the signal display sun visor 100 according to the various exemplary embodiments of the present invention, except that the signal display sun visor 100a includes a configuration that can serve to function as the traffic light detection terminal 200, that is, a traffic light detector 180. Since the traffic light detector 180 is included, the communication device 150 that communicates with the traffic light detection terminal 200, which is an external device, can be omitted.

The traffic light detector 180 determines a current location of a vehicle by receiving a GPS signal and determines whether or not a traffic light exists in front of the vehicle based on the current location through map information, and when the traffic light exists in front of the vehicle, the traffic light detector 180 notifies existence of the traffic light to the controller 170.

Operations of the above-described sun visors according to the first and various exemplary embodiments of the present invention will be described with reference to FIG. 4 to FIG. 7.

Figure 4:
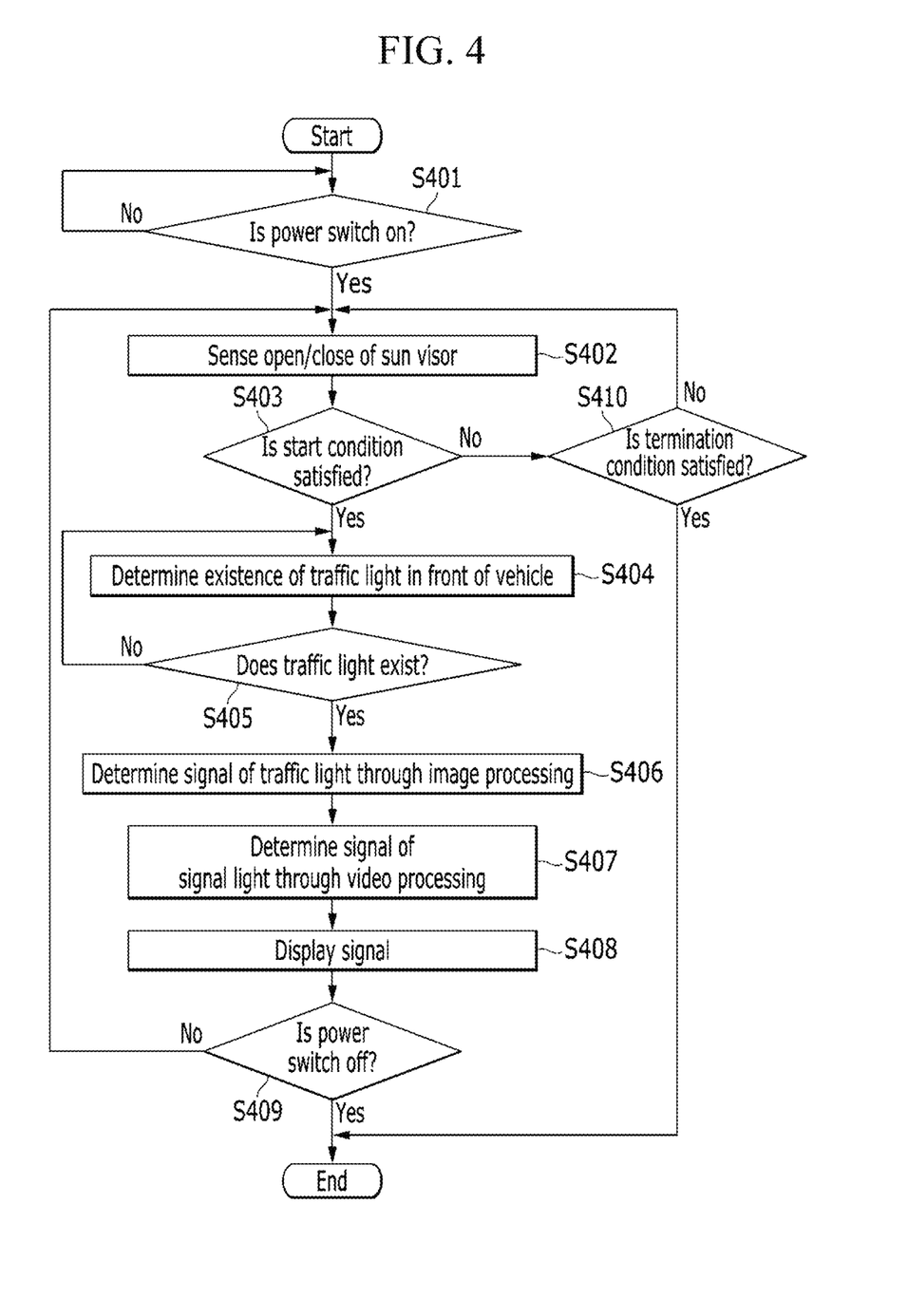
FIG. 4 shows an operation flowchart of the signal display sun visor according to the exemplary embodiment of the present invention.
Figure 5:
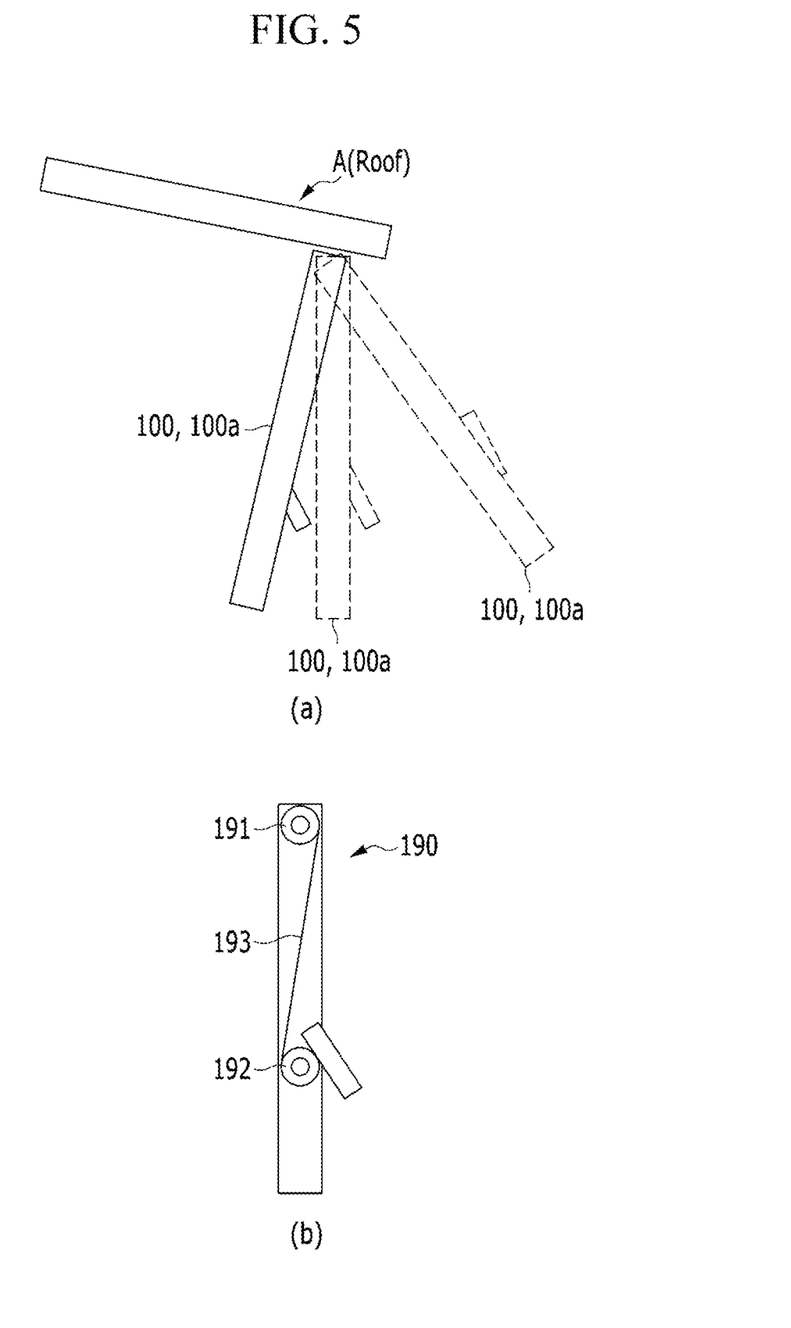
FIG. 5 shows constituent elements for controlling of an angle of a camera corresponding to a location angle of the signal display sun visor according to the exemplary embodiment of the present invention.
Figure 6:
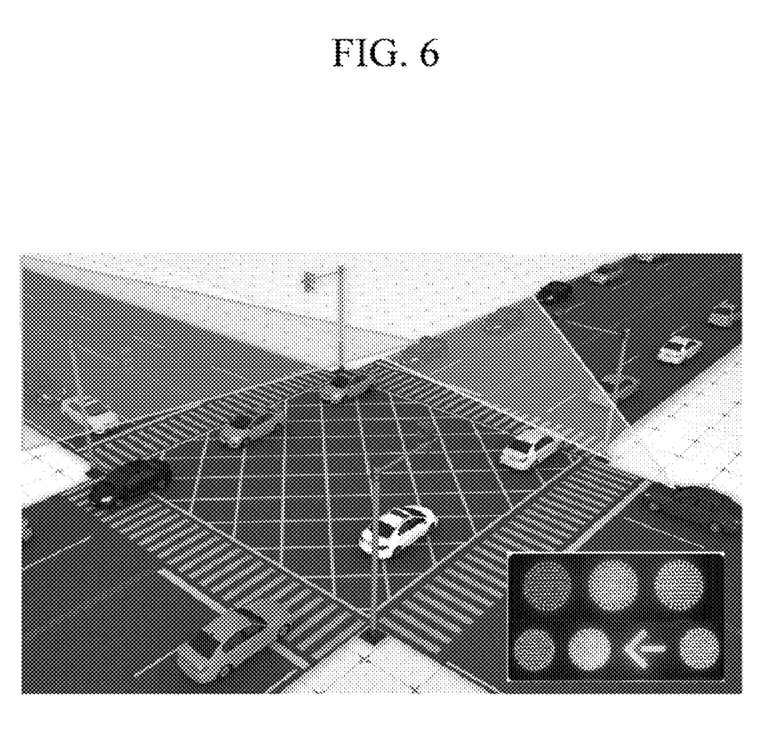
FIG. 6 shows an operation of the signal display sun visor at an intersection according to the exemplary embodiment of the present invention.
Figure 7:
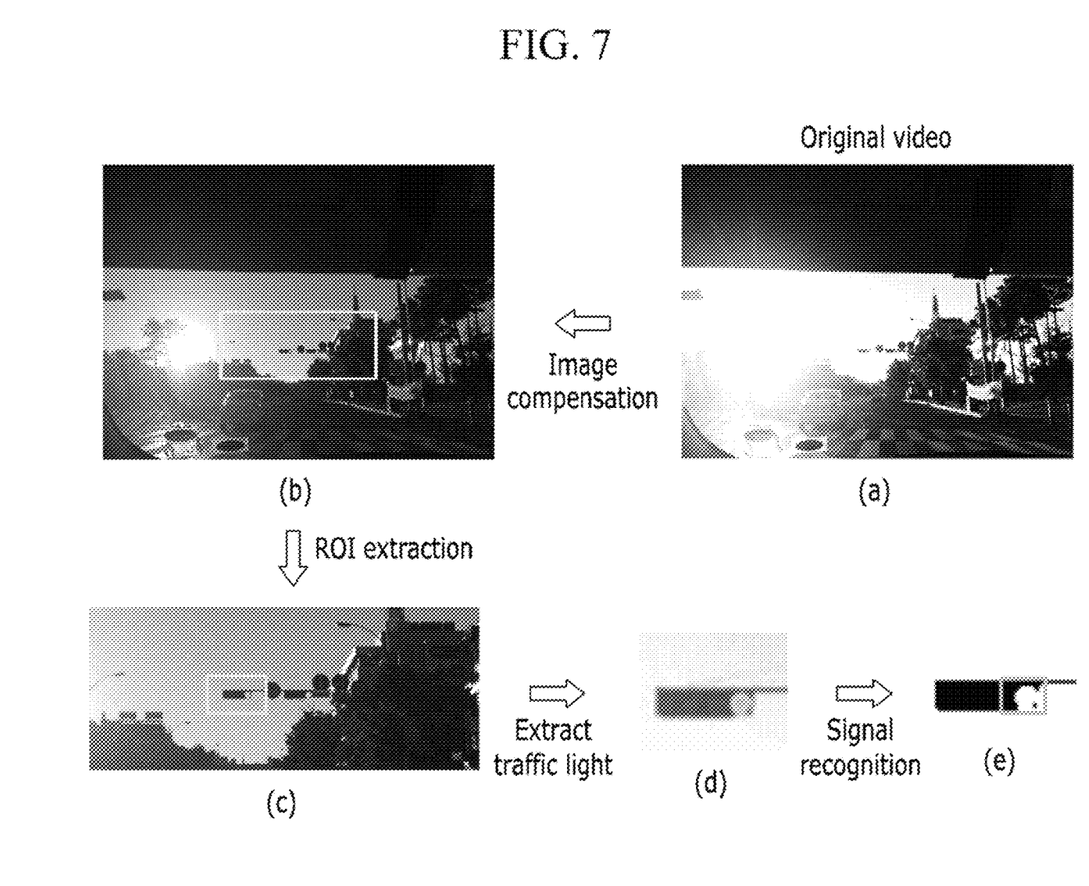
FIG. 7 shows a signal recognition process of a traffic light through an image in the signal display sun visor according to the exemplary embodiment of the present invention.

FIG. 4 is an operation flowchart of the sun visor according to the exemplary embodiment of the present invention, FIG. 5 shows a configuration of a camera angle controlled corresponding to a location angle of the signal display sun visor according to the exemplary embodiment of the present invention, FIG. 6 shows operation of the sun visor at a crosswalk according to the exemplary embodiment of the present invention, and FIG. 7 shows a signal recognition process of a traffic light through an image in the signal display sun visor according to the exemplary embodiment of the present invention.

When a user presses the power switch 130, a power supply supplies power to the respective constituent elements of the sun visor 100 or 100a (S401). In the instant case, the controller 170 maintains a state in which it does not operate even when power is supplied thereto, and controls the respective constituent elements to maintain the non-operating state even when power is supplied.

In such a state, the user opens the folded sun visor 100 or 100a.

In the instant case, the sun visor 100 or 100a may be provided with an angle controller 190. As shown in (a) of FIG. 5 the angle controller 190 can photograph in front of the vehicle in the same direction without regard to an opened angle of the sun visor 100 or 100a. That is, without regard the open angle of the sun visor 100 or 100a, the camera 110 maintains the same angle with respect to a fixed roof A. When the camera 110 can photograph a traffic light in front of the vehicle without regard to the open angle of the sun visor 100 or 100a, the angle controller 190 may be omitted.

As shown in (b) of FIG. 5, the angle controller 190 may include two pulleys 191 and 192 and a wire 193 which is connected to the two pulleys 191 and 192, or may include two gears 191 and 192 and a chain 193 connected to the two gears 191. One (e.g., a first pulley) of the two pulleys or one (e.g., a first gear) 191 of the two gears is provided in a hinge portion where the roof A is coupled, and the other pulley (e.g., a second pulley) or the other gear (e.g., a second gear) 192 is connected to the camera 110.

Thus, when the user opens the sun visor 100 or 100a, the first pulley (or the first gear) 191 rotates in the anticlockwise and then the second pulley (or second gear) 192 rotates in the clockwise direction, and accordingly, the camera 110 becomes gradually parallel with a longitudinal direction of the sun visor 100 or 100a in accordance with the rotation of the second pulley (or the second gear) 192. On the other hand, when the user folds the sun visor 100 or 100a, the first pulley (or the first gear) 191 rotates in the clockwise direction and thus the second pulley (or the second gear) 192 rotates in the anticlockwise direction, and accordingly, the camera 110 moves along a direction which is perpendicular to the longitudinal direction of the sun visor 100 or 100a in accordance with the rotation of the second pulley (or the second gear) 192.

When the sun visor 100 or 100a is opened, the folding detector 120 operates to detect whether the sun visor 100 or 100a is opened at greater than or equal to a predetermined angle. When the folding detector 120 detects the open angle, the folding detector 120 determines whether the open angle is greater than or equal to the predetermined angle, and outputs a condition satisfaction signal to the controller 170 when the open angle is greater than or equal to the predetermined angle (S402). Alternatively, when the folding detector 120 is provided as a switch, the folding detector 120 outputs the condition satisfaction signal to the controller 170 when the open angle is greater than or equal to the predetermined angle (S402).

When the controller 170 determines that start conditions are satisfied when receiving the condition satisfaction signal from the folding detector 120 (S403), it controls the communication device 150 or the traffic light detector 180 to determine whether a traffic light exists in front of the vehicle (S404).

The communication device 150 inquires of existence of a traffic light in front of the vehicle to the traffic light detection terminal 200 and receives a response through communication with the traffic light detection terminal 200, and notifies existence of the traffic light to the controller 170 when it exists. Alternatively, the traffic light detector 180 determines a current location of the vehicle through a GPS module to determine whether the current location is a crosswalk or an intersection where a traffic light exists in front of the vehicle based on stored map information, and notifies existence of the traffic light to the controller 170.

When recognizing existence of the traffic light in front of the vehicle through the communication device 150 or the traffic light detector 180 (S405), the controller 170 controls the camera 110 to photograph a view in front of the vehicle (S406). For example, as shown in FIG. 6, when the vehicle enters the intersection, the camera 110 operates to photograph a traffic light located in a traveling direction of the vehicle.

A digital image photographed by the camera 110 is provided to the image processor 140, the image processor 140 compensates the original image shown in (a) of FIG. 7, that is, the digital image photographed by the camera 110 like a digital image as shown in (b) of FIG. 7 for image processing, and then extracts a region (i.e., region of interest, ROI) where a traffic light exists as shown in (c) of FIG. 7. As such, the traffic light is extracted as shown in (d) of FIG. 7 from the compensated digital image to recognize a signal of the traffic light as shown in (e) of FIG. 7 (S407).

The recognized signal is provided to the controller 170, the controller 170 provides the signal recognized by the image processor 140 to the signal display device 160, and the signal display device 160 displays a signal that corresponds to the recognized signal of the traffic light (S408).

As such, the driver can determine a signal displayed in a traffic light located at the front crosswalk or front intersection by looking at the signal display device 160 of the sun visor 100 or 100a without checking the traffic light with the naked eye.

Such a signal recognition operation of the traffic light, that is, the processes from S404 to S408, are stopped when the driver turns off the power switch 130 or folds the sun visor 100 or 100a to less than the predetermined angle. Otherwise, the processes are continuously performed.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A signal display sun visor apparatus comprising:
   a camera that photographs an object in a front of a vehicle;
   a folding detector that detects whether a sun visor is opened;
   a traffic light detector that determines a current location of the vehicle by receiving a GPS signal and determines that a traffic light exists in the front of the vehicle based on the current location by use of map information;
   an image processor that determines existence of the traffic light from a digital image by processing and analyzing a digital image photographed by the camera and determines a signal of the determined traffic light;
   a signal display device that displays the signal of the traffic light determined by the image processor; and
   a controller configured to control operation of respective constituent elements including the camera, the traffic light detector, the image processor, and the signal display device, to operate when the sun visor is opened at greater than or equal to a predetermined angle, and to control the camera to photograph the traffic light when the traffic light exists in the front of the vehicle.

2. The signal display sun visor apparatus of claim 1, wherein the folding detector includes a switch that outputs an on-signal to the controller when the sun visor is opened at greater than or equal to the predetermined angle and outputs an off-signal to the controller when the sun visor is closed to less than the predetermined angle after being opened at greater than or equal to the predetermined angle.

3. The signal display sun visor apparatus of claim 1, wherein the folding detector includes an angle detector that determines an open angle of the sun visor, compares the determined open angle with the predetermined angle, and notifies the determined open angle to the controller when the determined open angle is greater than or equal to the predetermined angle, and notifies the determined open angle to the controller when the determined open angle is less than the predetermined angle after being opened at greater than or equal to the predetermined angle.

4. The signal display sun visor apparatus of claim 1, further including an angle controller that interworks with opening or closing operation of the sun visor to control an angle of the camera to photograph a view in the front of the vehicle in a constant direction without regard to an open angle of the sun visor.

5. The signal display sun visor apparatus of claim 4, wherein the angle controller includes a first device that rotates in a first direction according to an open degree of the sun visor, a second device that rotates in a second direction which is opposite to the second direction and is connected to the camera, and a third device that connects the first device and the second device configured for interworking of the first and second devices.

6. The signal display sun visor apparatus of claim 4, wherein the angle controller includes:
   a first pulley provided in a hinge portion where the sun visor and a roof are coupled;

a second pulley which is connected to the camera; and an interworking device connected to the first pulley and the second pulley for controlling the first pulley and the second pulley to interwork with each other.

7. The signal display sun visor apparatus of claim 4, wherein the angle controller includes:

a first gear provided in a hinge portion where the sun visor and a roof are coupled;

a second gear connected to the camera; and an interworking device connected to the first gear and the second gear for controlling the first gear and the second gear to interwork with each other.

8. The signal display sun visor apparatus of claim 1, wherein display of the signal display device is a same as a signal of the traffic light or is a text.

9. The signal display sun visor apparatus of claim 1, wherein the controller is activated when an open angle of the sun visor is greater than or equal to a first predetermined angle and is deactivated when the open angle of the sun visor in the activated state are less than a second predetermined angle through a signal received from the folding detector.

10. The signal display sun visor apparatus of claim 9, wherein the first predetermined angle and the second predetermined angle are equal to each other or different from each other.

11. The signal display sun visor apparatus of claim 1, wherein the traffic light detector is a navigation device disposed as an internal device in the vehicle.

12. The signal display sun visor apparatus of claim 1, wherein the traffic light detector is an external device including a mobile phone or a navigation device.

13. The signal display sun visor apparatus of claim 1, wherein the image processor extracts a region of interest (ROI) where the traffic light exists from the image photographed by the camera, extracts the traffic light from the ROI, and determines a signal of the extracted traffic light.

* * * * *